United States Patent [19]
Johnson et al.

[11] Patent Number: 5,193,595
[45] Date of Patent: Mar. 16, 1993

[54] BISCUIT JOINER ATTACHMENT FOR RADIAL ARM SAW

[76] Inventors: Clyde R. Johnson, Box 6, Claysville, Pa. 15323; Jerry Katrencik, 632 W. Grant St., Houston, Pa. 15342; Dennis W. Standiford, R.D. #8, Box 7D, Washington, Pa. 15301

[21] Appl. No.: 851,654

[22] Filed: Mar. 16, 1992

[51] Int. Cl.⁵ .......................... B27C 5/00; B27C 9/00; B26C 1/00
[52] U.S. Cl. .............................. 144/136 R; 83/406.1; 144/1 R; 144/1 F; 144/371; 144/134 B; 144/49
[58] Field of Search ............. 83/486.1; 144/1 R, 1 E, 144/1 F, 1 G, 134 R, 134 B, 134 D, 136 R, 136 C, 371, 49

[56] References Cited

U.S. PATENT DOCUMENTS

| | | | |
|---|---|---|---|
| 1,422,971 | 7/1922 | Hanson | 144/134 B |
| 1,628,845 | 5/1927 | Jackson | 144/134 B |
| 2,672,170 | 3/1954 | Johnson | 144/134 B |
| 2,852,050 | 9/1958 | Horstmann et al. | 144/134 B |
| 3,565,134 | 2/1971 | Toms | 144/1 F |
| 4,454,898 | 6/1984 | Pavnica | 144/1 F |

*Primary Examiner*—W. Donald Bray
*Attorney, Agent, or Firm*—William L. Krayer

[57] ABSTRACT

An attachment for a radial arm saw to enable biscuit slot cutting includes a separate housing on said radial arm, means for attaching a biscuit slot blade, means for transmitting power to said blade from said radial arm, and means for manipulating said housing with said biscuit slot blade independently of said radial arm.

7 Claims, 5 Drawing Sheets

BISCUIT JOINER ATTACHMENT FOR RADIAL ARM SAW

TECHNICAL FIELD

This invention relates to the field of woodcrafting power tools, and more particularly to an attachment for a radial arm saw for preparing wood for fastening through biscuit joining.

BACKGROUND OF THE INVENTION

Prior to the present invention, "wood biscuit joining" has been relatively recently introduced to professional and home workshops. The technique involves gluing an elliptical or similarly shaped wafer of wood or cellulose material into slot-type holes generally of a semicircular shape cut into the two wooden parts to be joined. The wafer is not merely glued but caused to swell inside the slots, forming an extremely high strength bond virtually invisible from outside.

Such wafers or biscuits are readily available in various sizes. Special rotary blades are also available for cutting the holes or slots; these of course must be used in power tools which accept them. Typically, the biscuit blades in use have a generally hexagonal shape, may be from about three to about five inches in diameter, for example, and have clearing teeth as well as cutting teeth. The special power tools which accept the blades are designed to be hand-held, which is the source of the problem.

Difficulties in using the hand-held biscuit slot cutter include its unwieldy shape and weight, problems in coordinating the position, direction and depth of the cut, steadying, and even locating the correct position for the slot. The slots on the two pieces of wood to be joined must be correctly placed because the placement of the biscuit may affect the accuracy of the joint; likewise the direction and angle of the slot must coordinate with both pieces of wood.

The present invention provides a fixed mount for the biscuit blade, thus eliminating many of the problems of accuracy and the requirements of vigilant balance and hand-eye coordination.

Radial arm saws have long been known, and mechanisms for adjusting the height, for example of radial arm saws, such as disclosed by Rosenthal in U.S. Pat. No. 3,565,136 are also known in the art. Rosenthal provides a pivot for the frame which holds the radial arm saw on the saw arm. Other attachments for radial arm saws in the prior art include means for clamping the wood specimen for a particular type of cut, such as, in the case of Kimber, U.S. Pat. No. 3,466,025, making a wedge cut. Also known in the prior art are various types of adjustable or movable guards for the blade, which may be typified by Kumasaka et al, in U.S. Pat. No. 4,799,416. We are not aware, however, of an attachment to a radial arm saw for the specific purpose of employing a biscuit slot cutter.

SUMMARY OF THE INVENTION

Our invention is an attachment specifically for making biscuit slots; the attachment utilizes the power and positioning abilities of a conventional radial arm saw, yet provides additional maneuverability through swivel and height adjustments, with an appropriate guard, specifically for the biscuit blade. Our device is adapted to be powered by the conventional radial arm saw by simply removing the radial arm blade and attaching our unit to the power drive of the radial arm saw. The unit may then be moved into an approximate position with the radial arm saw adjustments, and additionally maneuvered utilizing the independent positioning means to be described in detail below. Once positioned correctly, the blade in our unit can be pivoted by an independent handle to make the wafer cut. The operator can thus concentrate on correct positioning and precision, rather than being preoccupied with balance, steadiness, and hand-eye coordination. Most of the physical work is done for him, and he can simply make the cut.

DETAILED DESCRIPTION OF THE INVENTION

Figure 1:
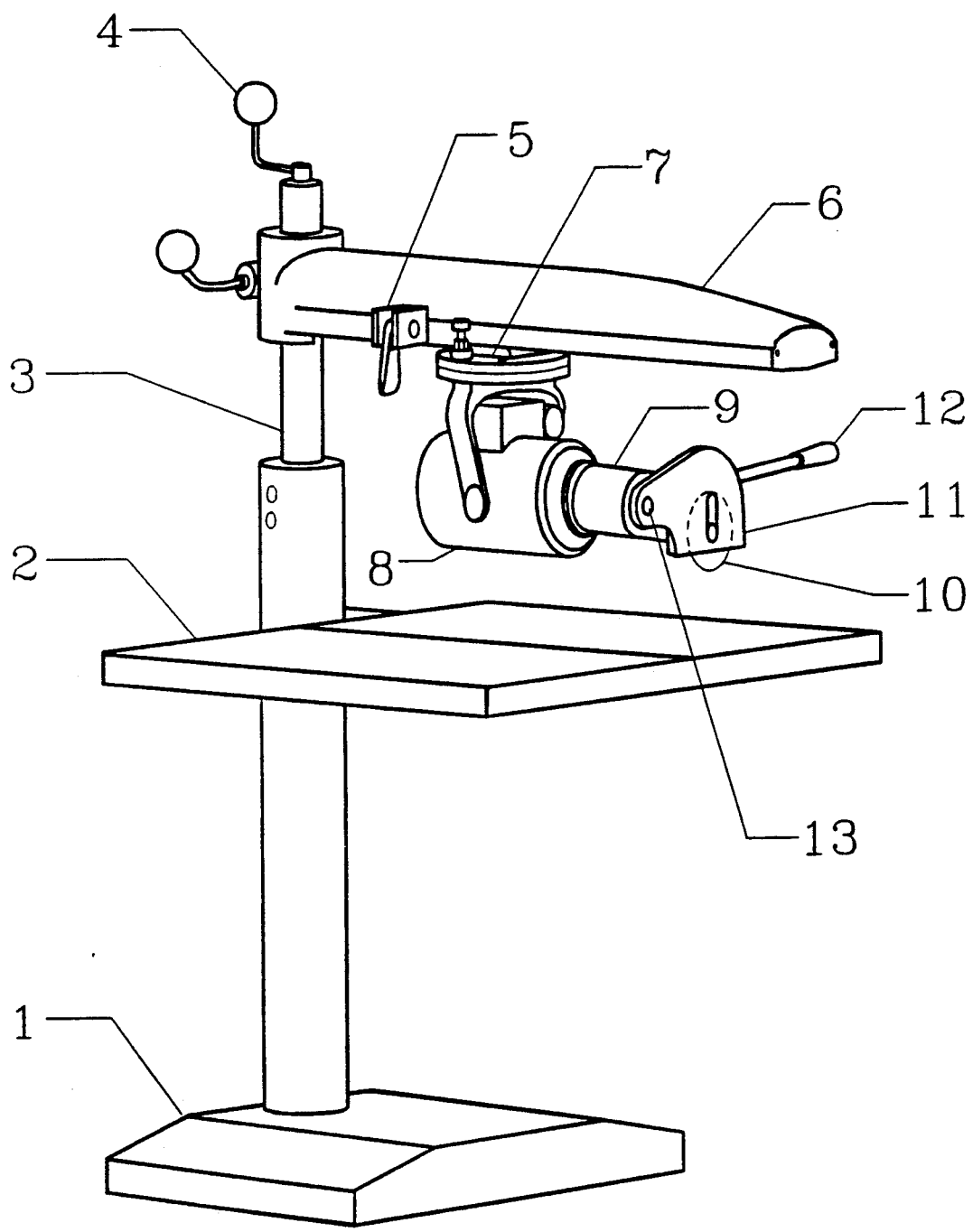
FIG. 1 is a perspective view of our biscuit attachment mounted on a conventional radial arm device.

Referring now to FIG. 1, a more or less conventional radial arm saw is shown having a base 1, a horizontal table 2, a vertical stand 3 with height adjustment means 4, motor travel limit 5 on the radial arm 6 itself. Radial arm 6 includes a mounting 7 for positioning the electric motor drive s with the ability to swivel 360 degrees on a vertical axis and tilt ninety degrees or more on the horizontal axis as well as the length of the radial arm 6. In FIG. 1, the invention assembly is shown attached where a conventional saw blade (not shown) would be fixed. The housing 9 covers the transmission for obtaining power for the biscuit saw 10 from the parent radial arm motor 8. FIG. 1 also shows the guard 11, biscuit saw 10, and handle 12. Pivot 13 is also depicted.

Figure 2:
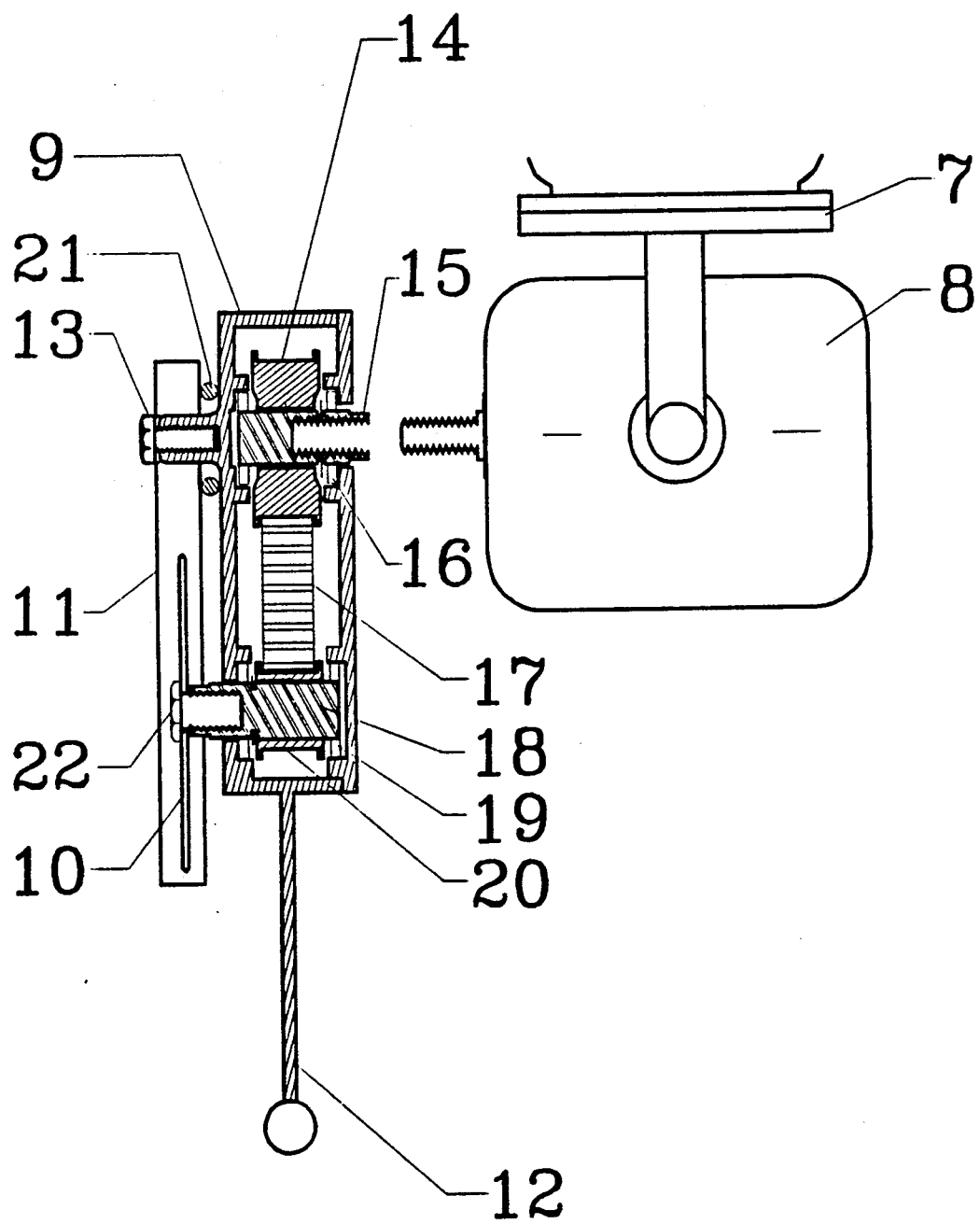
FIG. 2 is a front elevational and sectioned view of the biscuit saw attachment.

In FIG. 2, the invention is shown in partial cross section detached from motor s and mounting 7. Housing 9 retains an input shaft 15 mounted on bearings 16 and within cog 14. The housing 9 also retains an output shaft 18 to which is connected the biscuit sawblade 10, held in place by bolt 22. Shrouding the sawblade 10 is guard 11, which is mounted on pivot 13. Pivot 13 enables guard 11 to pivot or rotate independent of the motion of the housing 9 caused by the application of manual force to handle 12 to turn the housing 9 along the rotational axis of the shaft 15. Drive belt 17 connects input shaft 15 and output shaft 18. Pivot spring 21 is set in a recess formed by housing 9 and guard 11. Pivot spring 21 urges the housing 9 and guard 11 to flex in opposition to the manual force; this motion is controlled and limited by index cam 27 and cam pin 28 shown in FIG. 5.

Figure 3A:
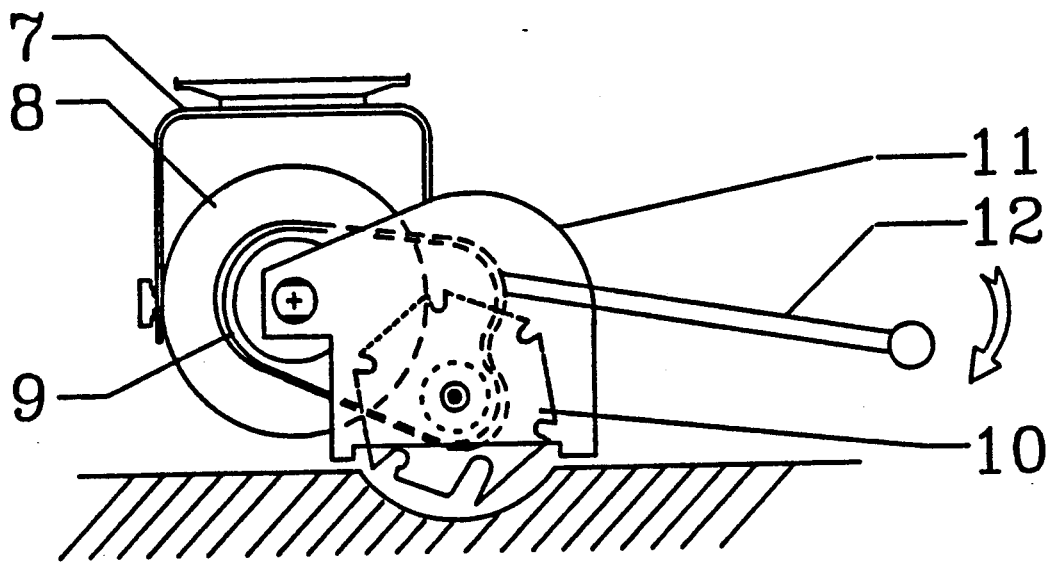
FIGS. 3a and 3b illustrate from a side elevational view the cutting and recessed modes of the biscuit cutter attachment.

FIG. 3a shows the attachment in a cutting maneuver. When handle 12 is depressed, housing 9 and blade 10 rotate down into wood specimen. Guard 11 does not rotate because of contact with wood specimen.

Figure 3B:
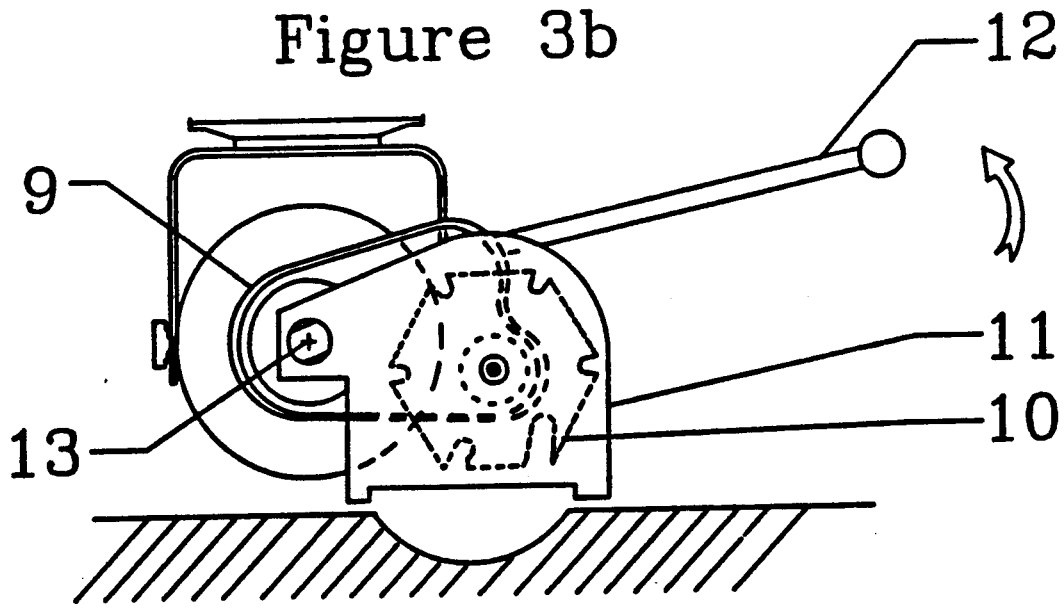

In FIG. 3b, biscuit saw is in a non-cutting position, handle 12 is shown raised and blade 10 is covered by guard 11. FIG. 3b shows assembly while blade is rotating under power, with hands off position. The combination of the impetus of transmission, (torque forcing guard to rotate clockwise and down) and the pivot 13, and pivot spring 21 (not shown) which forces housing to rotate counter clockwise in opposition to guard, causes guard to seat on wood specimen, and blade to retract into guard producing a safety feature and flexible cutting movement not available on conventional radial arm saws.

Figure 4:
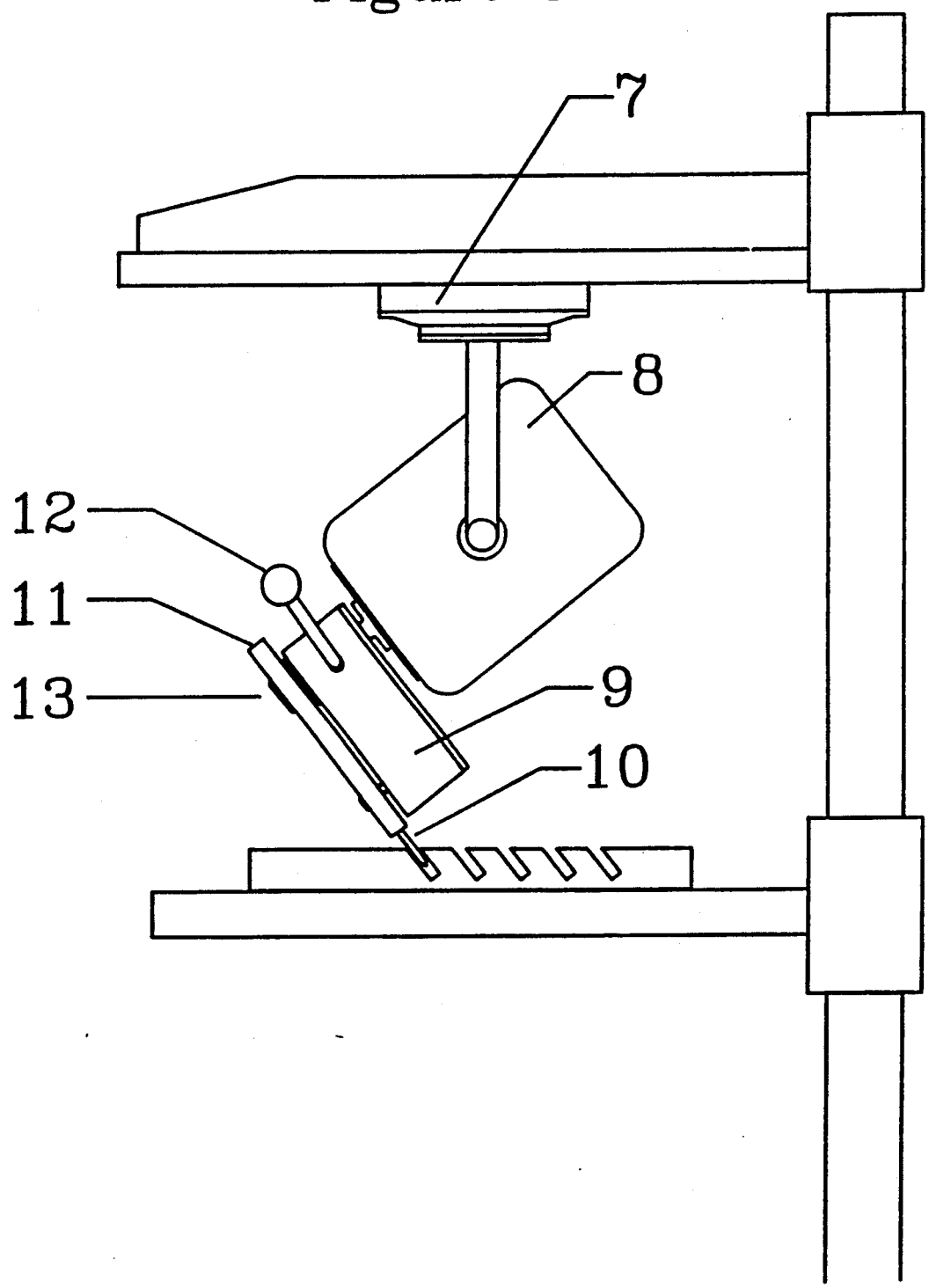
FIG. 4 is a side elevational view of the biscuit cutter making an angular cut.

In FIG. 4, the motor s has been tipped conventionally and the handle 12 is used to rotate the housing 9 incorporating the transmission parts (not seen) and the sawblade 10 at an angle as shown. Guard 11 is shown in the "up" position as the blade 10 protrudes for cutting, to protect the user. FIG. 4 demonstrates that the pivoting motion at pivot 13, between guard 11 and housing 9, will work at any attitude described by the conventional radial arm adjustments, while maintaining the inherent safety values of the invention.

Figure 5:
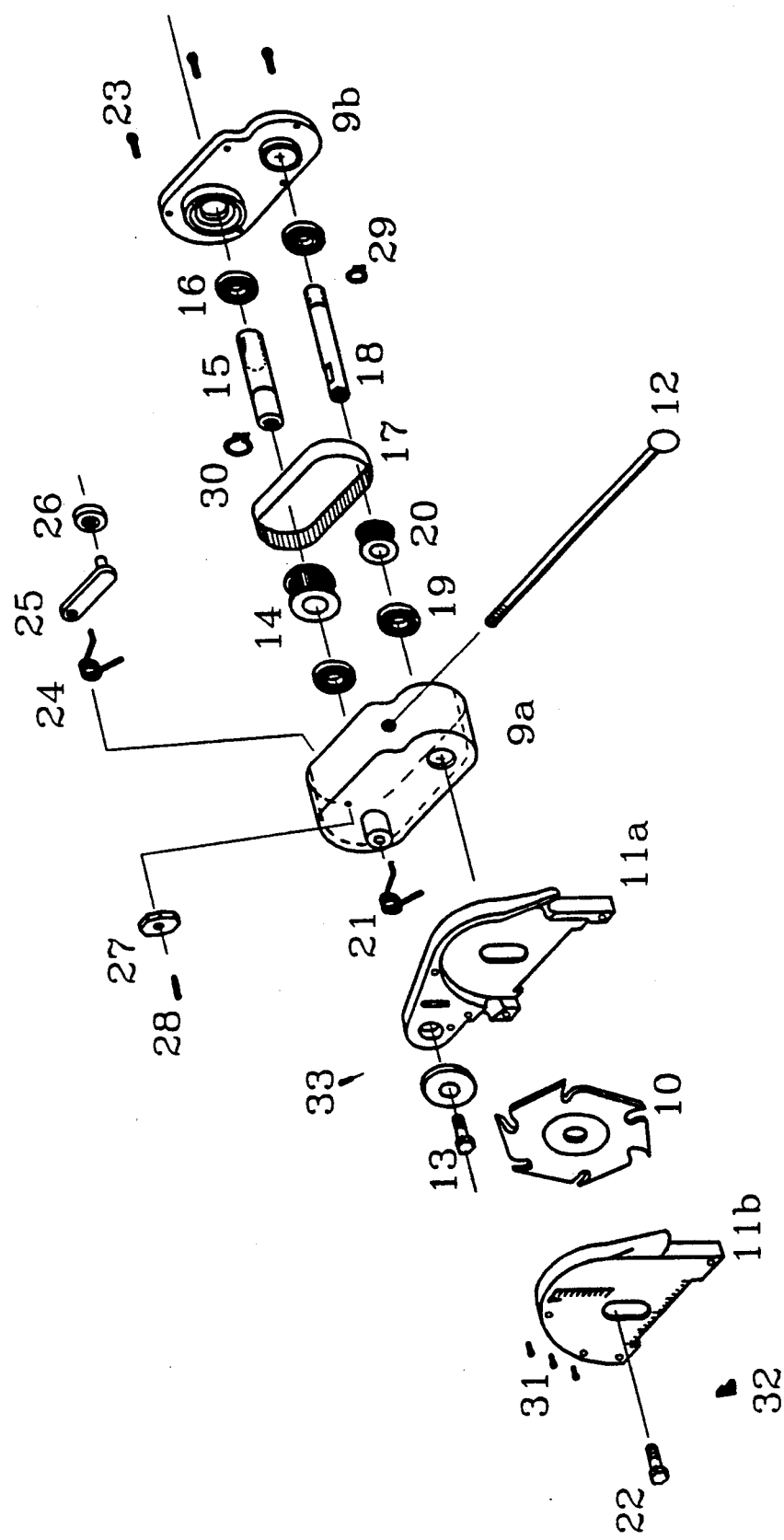
FIG. 5 is an exploded view of the biscuit cutter assembly.

A more detailed assembly of our preferred attachment is shown in FIG. 5. Here it is seen that the housing 9 may comprise a main compartment 9a and a cover 9b. Input shaft 15 and output shaft 18 are seen to be parallel and assisted in placement by bearing sets 16 and 19, inside of housing compartment 9a and cover 9b. Cog 14 is located on shaft 15 by spring clip 30 and cog 20 is located on shaft 18 by spring clip 29. Belt 17 spans cog 14 and cog 20, and is held in tension by spring 24, tension arm 25 and arm roller 26. The saw blade 10 is affixed to output shaft 18 by a reverse thread retaining bolt 22. Pivot bolt 13 fits through an aperture on guard front 11a and then through pivot spring 21 into housing compartment 9a. Fixed to housing compartment 9a are depth index cam 27 and cam pin 28, such that it will obstruct the movement of guard 11. As the index cam 27 is dialed, guard 11 is prohibited from uncovering the blade 10 to a degree reflecting a depth of cut adjustment. Housing fasteners 23 and guard fasteners 31 hold their respectable parts together, while pivot adjustment screw 33 permits changing the angle and tension of the guard pivot spring 21. Blade center cut indicator 32 is optional.

It is to be understood that our invention is not limited to the above described specific embodiments, but may be otherwise varied within the scope of the following claims.

W e claim:

1. A biscuit slot cutter attachment for a radial arm saw having an electric motor saw blade drive in a frame suspended from a radial arm, said frame including means for manually maneuvering said frame together with said saw blade, said biscuit slot cutter attachment comprising a biscuit slot cutter attachment housing, a shaft therein, means for attaching a biscuit saw blade to said shaft, drive transmission means associated with said housing for receiving drive power from said electric motor power drive and transmitting drive power to said shaft, and means independent of said radial arm saw and said frame thereof for manually maneuvering said biscuit slot cutter attachment.

2. A biscuit slot cutter attachment of claim 1 including a cover guard for said biscuit saw blade.

3. A biscuit slot cutter attachment of claim 2 wherein the means for manually maneuvering includes a handle.

4. Biscuit slot cutter attachment of claim 1 including a biscuit saw blade.

5. Biscuit slot cutter attachment of claim 2 wherein said cover guard is adapted to cover an entire biscuit saw blade and to rest on the surface of a wafer cut specimen while a cut is made.

6. Biscuit slot cutter attachment of claim 2 wherein the means for manually maneuvering said biscuit slot cutter attachment includes a pivot on said housing for pivoting said cover guard.

7. Biscuit slot cutter attachment of claim 1 wherein said means for manually maneuvering said biscuit slot cutter attachment is spring biased to return said attachment to a home position.

* * * * *